United States Patent
Wang et al.

(10) Patent No.: US 7,912,456 B2
(45) Date of Patent: Mar. 22, 2011

(54) METHOD AND APPARATUS FOR IMPROVING VOICEMAIL NOTIFICATIONS TO MULTIMODE DEVICES

(75) Inventors: Feng Wang, Austin, TX (US); Huitao Liu, Round Rock, TX (US); Muhamed Rias, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 35 days.

(21) Appl. No.: 11/177,951

(22) Filed: Jul. 8, 2005

(65) Prior Publication Data

US 2007/0010233 A1    Jan. 11, 2007

(51) Int. Cl.
*H04M 11/10* (2006.01)
(52) U.S. Cl. .................. 455/413; 455/412.1; 455/412.2
(58) Field of Classification Search .............. 455/412.1, 455/412.2, 413, 552.1, 435.1
See application file for complete search history.

(56) References Cited

U.S. PATENT DOCUMENTS

| | | | |
|---|---|---|---|
| 6,298,232 B1* | 10/2001 | Marin et al. | 455/413 |
| 6,389,276 B1* | 5/2002 | Brilla et al. | 455/413 |
| 6,560,318 B1* | 5/2003 | Spielman et al. | 379/88.12 |
| 2003/0142798 A1* | 7/2003 | Gavette et al. | 379/88.12 |
| 2004/0023643 A1* | 2/2004 | Vander Veen et al. | 455/413 |
| 2005/0186943 A1* | 8/2005 | Hasan et al. | 455/413 |
| 2005/0186944 A1* | 8/2005 | True et al. | 455/413 |
| 2005/0202849 A1* | 9/2005 | Ignatin | 455/564 |
| 2005/0287993 A1* | 12/2005 | Gogic | 455/413 |
| 2006/0025129 A1* | 2/2006 | Wolfman et al. | 455/432.1 |
| 2007/0054665 A1* | 3/2007 | Elkarat et al. | 455/432.1 |

* cited by examiner

*Primary Examiner* — Wayne Cai
(74) *Attorney, Agent, or Firm* — Ed Guntin; Guntin Meles & Gust, PLC.

(57) ABSTRACT

A voicemail system (100) has a wireless unit (102) for conveying wireless messages to multimode mobile devices (108) by way of a wireless communication network (106) operating independently of a telephony system (105) also capable of communicating with said devices, and a voicemail server (104) coupled to the telephony system and the wireless unit. The voicemail server is programmed to store (208) a message from a calling party when the multimode mobile device of the called party is inaccessible by way of the telephony system, construct (210) a voicemail notification corresponding to the recorded message, and transmit (218) a wireless message including the voicemail notification directed to a select multimode mobile device.

20 Claims, 2 Drawing Sheets

METHOD AND APPARATUS FOR IMPROVING VOICEMAIL NOTIFICATIONS TO MULTIMODE DEVICES

FIELD OF THE INVENTION

This invention relates generally to voicemail systems, and more particularly to a method and apparatus for improving voicemail notification to multimode devices.

BACKGROUND OF THE INVENTION

Multimode communication devices such as cellular phones with Bluetooth™ or IEEE 802.11 interfaces are readily available, thereby providing multifunctional means for communication. For example, such devices can be used for traditional voice communications in cellular networks. With the advent of VoIP (Voice over Internet Protocol), the same devices can also be used for VoIP communications in areas where Bluetooth or IEEE 802.11 services are provided.

It is not uncommon to have independent service providers for cellular and VoIP services with disparate contact numbers. In such instances, voicemail services can be a problem. For example, when a caller attempts to reach a party on a VoIP number, and the targeted party is roaming on a cellular network, there will be no means to notify the targeted party of a voicemail recording left by the calling party on the VoIP network. Until the targeted party roams again on the VoIP network, it may be quite sometime before the targeted party is notified of the voicemail message.

A need therefore arises for a method and apparatus for improving voicemail notification to multimode devices.

SUMMARY OF THE INVENTION

Embodiments in accordance with the invention provide a method and apparatus for improving voicemail notification to multimode devices.

In a first embodiment of the present invention, a voicemail system has a wireless unit for conveying wireless messages to multimode mobile devices by way of a wireless communication network operating independently of a telephony system also capable of communicating with said devices, and a voicemail server coupled to the telephony system and the wireless unit. The voicemail server is programmed to store a message from a calling party when the multimode mobile device of the called party is inaccessible by way of the telephony system, construct a voicemail notification corresponding to the recorded message, and transmit a wireless message including the voicemail notification directed to a select multimode mobile device.

In a second embodiment of the present invention, a method operates in a voicemail server coupled to a telephony system and a wireless unit for conveying wireless messages to multimode mobile devices by way of a wireless communication network operating independently of the telephony system which is also capable of communicating with said devices. The method has the steps of storing a message from a calling party when the multimode mobile device of the called party is inaccessible by way of the telephony system, constructing a voicemail notification corresponding to the recorded message, and transmitting a wireless message including the voicemail notification directed to a select multimode mobile device.

In a third embodiment of the present invention, a computer-readable storage medium operates in a voicemail server coupled to a telephony system and a wireless unit for conveying wireless messages to multimode mobile devices by way of a wireless communication network operating independently of the telephony system which is also capable of communicating with said devices. The storage medium has computer instructions for storing a message from a calling party when the multimode mobile device of the called party is inaccessible by way of the telephony system, constructing a voicemail notification corresponding to the recorded message, and transmitting a wireless message including the voicemail notification directed to a select multimode mobile device.

DETAILED DESCRIPTION OF THE DRAWINGS

Figure 1:
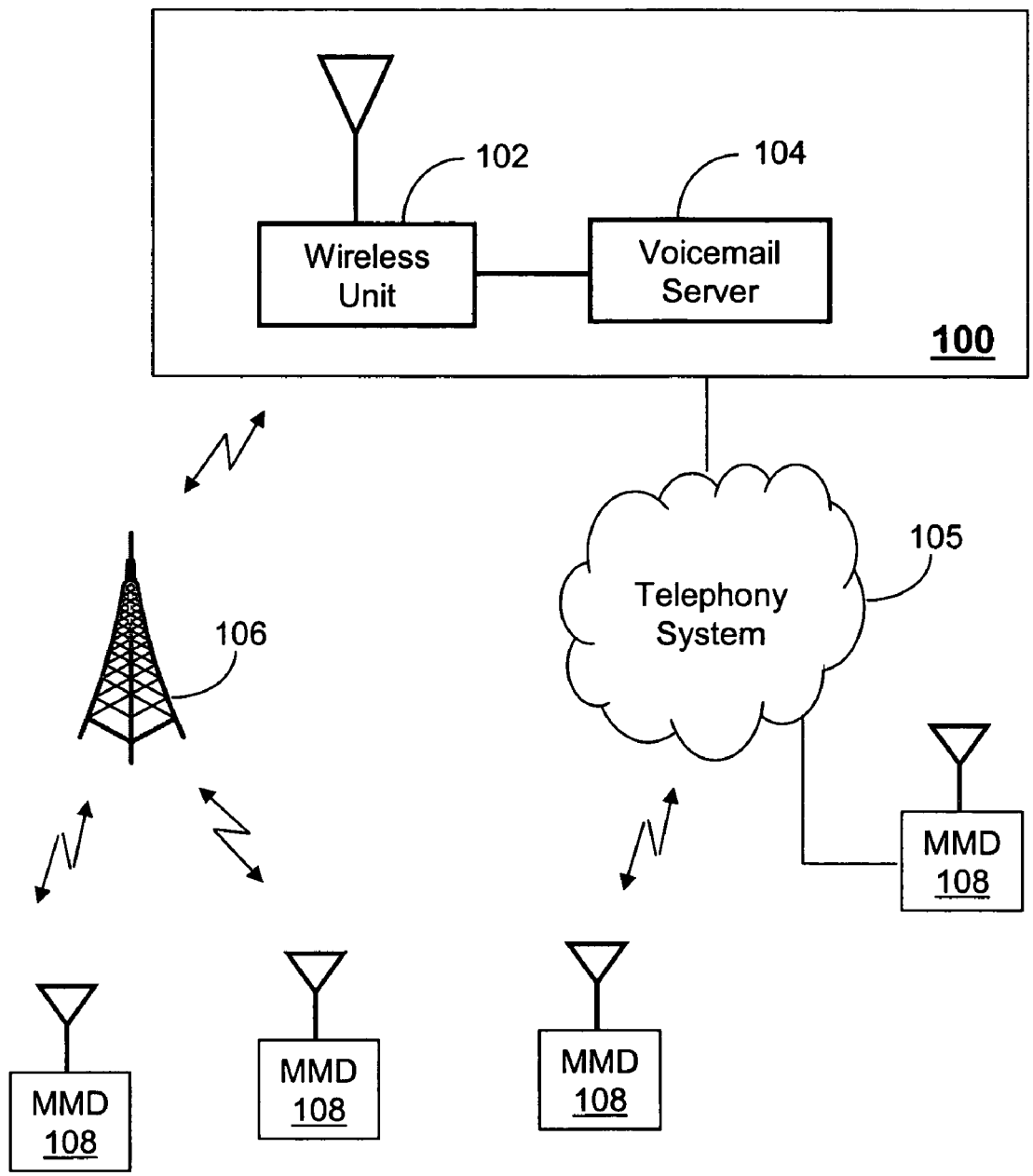
FIG. 1 is block diagram of a voicemail system according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram of a voicemail system 100 according to an embodiment of the present invention. The voicemail system 100 comprises a wireless unit 102 and a voicemail server 104. The wireless unit 102 utilizes, for example, any conventional short-range, mid-range or long-range wireless technology for communicating with multimode mobile devices (MMD) 108. Wireless technologies can include without limitation first, second or third generation technologies such as Bluetooth, IEEE 802.11 a/b/g, GSM, CDMA, GSM/GPRS, TDMA, GSM/Edge, EV/DO, UMTS, wireless VoIP, and so on. The wireless unit 102 can integrate one or more of these communication technologies as needed to communicate with MMDs 108 roaming one or more wireless communication systems 106.

The voicemail server 104 utilizes conventional technology for storing messages of a calling party. These messages can include, for example, the calling party's number, and/or a voice message provided thereby. The voicemail server 104 can utilize any conventional technology for storing messages of a calling party. For instance, the voicemail server 104 can utilize a conventional IVR (Interactive Voice Response) system to guide the calling party in the voicemail process along with providing conventional storage media for recording said messages. The voicemail server 104 can utilize any conventional computing technology such as a desktop computer, or for scalability, a conventional server.

The voicemail server 104 is coupled to the wireless unit and a telephony system 105. The telephony system 105 can utilize any conventional telephony packet or circuit switch technology for interconnecting MMD 108 end users with targeted parties. The telephony system 105 can utilize a hybrid of wired and wireless communication technologies to communicate with the MMDs 108. Thus, for example, an MMD 108 can communicate wirelessly with the telephony system 105 much like a cordless phone in a home using Bluetooth. Similarly the MMD 108 can communicate by way of IEEE 802.11 at a retail center supporting wireless connectivity with a wireless access point. Alternatively, the MMD 108 can be tethered to a wired interface to communicate with the telephony system 105 much like a conventional POTS (Plain Old Telephone Service) unit in the home. For either wireless or wired communications, the telephony system 105 can support VoIP communications and/or conventional circuit switch voice and data communications.

The MMDs 108 shown are conventional multimode communication devices capable of wireless and wired communications with multiple communication systems. An MMD 108 can be represented by, for example, a dual-mode cellular and VoIP phone. Such a device can communicate with a conventional cellular network as shown in FIG. 1, and by wired or wireless means with the telephony system 105 supporting in this illustration VoIP services. The MMD 108 can be programmed to camp on VoIP as a priority, assuming such services are less expensive than cellular services. Thus, as the end user of the MMD 108 roams, the MMD 108 camps on either the cellular network 106 or the telephony system 105 depending on availability and priority settings.

Figure 2:
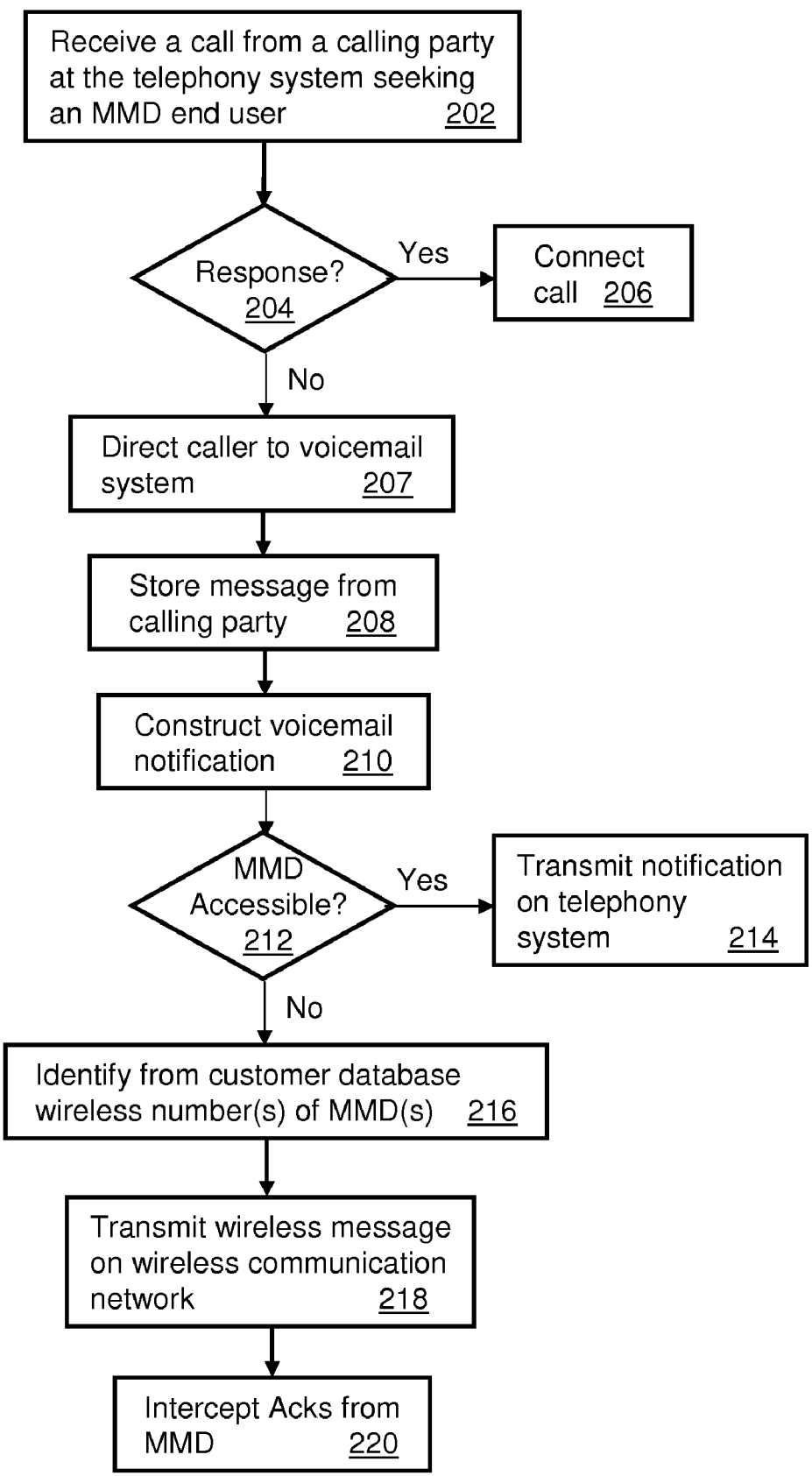
FIG. 2 depicts a flowchart of a method operating in the voicemail system according to an embodiment of the present invention.

The cellular network 106 and the telephony system 105 can be managed by independent service providers who do not share voicemail systems. Accordingly, when the end user of an MMD 108 roams outside of the telephony system 105, said end user will not know when a message has been recorded by the voicemail system 100. To resolve this prior art deficiency, the voicemail system 100 operates according to a method 200 depicted in the flowchart of FIG. 2 in accordance with an embodiment of the present invention.

Method 200 begins with step 202 where the telephony system 105 receives a call from a calling party who is attempting to reach an end user of an MMD 108. If in step 204 the end user responds, then the telephony system 105 connects the calling party with MMD 108 in step 206. This connection can be circuit switched or packet switched. If, on the other hand, the telephony system 105 receives no response either because the end user is not responding or the MMD 108 is not reachable, then the telephony system 105 proceeds to step 207 where it directs the calling party to the voicemail system 100. In this step the voicemail system 100 can guide the caller by way of, for example, a voice menu system (such as that of an IVR) through the message recording process.

In response to the caller's instruction, the voicemail system 100 proceeds to step 208 where it stores the caller's message (e.g., caller's number, and/or voice message) in the voicemail server 104. In step 210, the voicemail server 104 constructs a voicemail notification corresponding to the recorded message. If in step 212 the MMD 108 is accessible by the telephony system 105, then said system transmits the notification to the MMD 108. If instead, the MMD 108 is roaming outside of the telephony system 105, then the voicemail system 100 proceeds to step 216 where it identifies in a database of customers stored in the voicemail server 104 a wireless number for the MMD 108. To find the wireless number, the customer database can be indexed by the calling number used by the calling party which identifies the end user of the MMD 108. Where the calling number is shared by multiple MMDs 108 similar to someone calling a residential number, the customer database can supply multiple wireless numbers corresponding to multiple MMD 108 end users.

Once the wireless number or numbers have been identified, the voicemail system proceeds to step 218 where it transmits a wireless message including the voicemail notification to the wireless communication system 106, which in turn relays said message to the targeted MMD 108. Any technique can be applied to the construction of the voicemail notification so as to convey to the end user of the MMD 108 that s/he has received voicemail. For instance, the wireless message can be an SMS (Short Message Services) message consisting of text with the caller's number, and/or the time of day of the recorded message.

Alternatively, the wireless message can include a portion of the recorded message, which can be played out on the MMD 108. In yet another embodiment, the voicemail notification can include a sequence of strings that the MMD 108 is programmed to process and therefrom assert a voicemail icon on a display of the MMD 108 indicating to the end user that voicemail is available in the voicemail system 100 of the telephony system 105. It would be obvious to one of ordinary skill in the art that there are innumerable techniques for constructing a notification message that can be applied to the present invention.

In a supplemental embodiment, the MMD 108 can be programmed to respond with an acknowledgment message (or messages if multiple MMDs 108 were notified), which is transmitted back to the voicemail system 100 by way of the wireless communication system 106. This acknowledgment is intercepted and processed by the voicemail system 100 in step 220.

It should be evident by now that the present invention can be realized in hardware, software, or a combination of hardware and software. Moreover, the present invention can be realized in a centralized fashion, or in a distributed fashion where different elements are spread across several interconnected processors. Thus, any kind of computing device or other apparatus adapted for carrying out method 300 described above is suitable for the present invention.

It should be also evident that the present invention may be used for many applications. Thus, although the description is made for particular arrangements and methods, the intent and concept of the invention is suitable and applicable to other arrangements and applications not described herein. For example, method 200 can be reduced to step 208, 210 and 218 consistent with the claimed invention. It would be clear therefore to those skilled in the art that modifications to the disclosed embodiments described herein could be effected without departing from the spirit and scope of the invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

A software program in the present context means any expression, in any language, code or notation, of a set of instructions intended to cause a system having an information processing capability to perform a particular function either directly or after either or both of the following: a) conversion to another language, code or notation; b) reproduction in a different material form.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, other re-writable (volatile) memories. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art that are applicable to the present invention. Such standards are periodically superseded by faster or more efficient equivalents having essentially the same functions. Accordingly, replacement standards and protocols having the same functions are considered equivalents.

The described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. A voicemail system, comprising:
    a wireless unit for conveying wireless messages to a multimode mobile device of a called party by way of a wireless cellular communication network; and
    a voicemail server providing voicemail services to a telephony system,
    wherein the telephony system is adapted for communications with a multimode device of a calling party using at least first and second modes of voice communication, and wherein the telephony system determines a voice mode of voice communication to utilize and provides the multimode device of the calling party with voice services using the first mode of voice communication based on the determined voice mode,
    wherein the wireless cellular communication network provides the multimode mobile device of the called party with voice and data services using third and fourth modes of communication,
    wherein the first, second, third and fourth modes of communication utilize different communication protocols, and
    wherein the voicemail server is programmed to:
    store a voicemail message from the multimode device of the calling party when the multimode mobile device of the called party is non-responsive to a call initiated by the calling party by way of the telephony system using the first mode of voice communication of the multimode device;
    construct a voicemail notification corresponding to the recorded message;
    detect that the multimode mobile device of the called party is not roaming on the telephony system; and
    responsive to said detection, transmit to the multimode mobile device by way of the wireless cellular communication network a wireless message including the voicemail notification using the third mode of communication of the multimode mobile device.

2. The voicemail system of claim 1, wherein the first mode of communication corresponds to circuit switched voice communications, wherein the second mode of communication corresponds to packet switched voice communications, wherein the third mode of communication corresponds to cellular voice communications, and the fourth mode of communication corresponds to cellular data communications.

3. The voicemail system of claim 1, wherein the telephony system is managed by a first service provider, wherein the wireless communication network is managed by a second service provider, wherein the first and second service providers operate the telephony system and the wireless communication network respectively as commercially independent enterprises, and wherein the second service provider does not have access to the voice mail server without the voicemail notification.

4. The voicemail system of claim 1, wherein the voicemail notification comprises at least one among a group of notifications comprising an identification of the calling party, a time of day when the voicemail was recorded, and a portion of the recorded message.

5. The voicemail system of claim 1, wherein the voicemail server has a database of customers and associated contact information, and wherein the voicemail server is programmed to identify from the database of customers according to a calling number used by the calling party a wireless number corresponding to the multimode mobile device of the called party.

6. The voicemail system of claim 1, wherein a calling number used by the calling party is shared among two or more customers of the voicemail system, wherein the voicemail server has a database of customers and associated contact information, and wherein the voicemail server is programmed to:
    identify from the database of customers according to the calling number used by the calling party two or more wireless numbers corresponding to two or more multimode mobile devices; and
    transmit two or more wireless messages including the voicemail notification destined for the two or more multimode mobile devices.

7. The voicemail system of claim 6, wherein the voicemail server is programmed to intercept two or more acknowledgments from the two or more multimode devices indicating they have received the wireless messages.

8. A voicemail system, comprising:
    a wireless unit for conveying wireless messages to a multimode mobile device of a called party by way of a wireless cellular communication network; and
    a voicemail server providing voicemail services to a telephony system,
    wherein the telephony system is adapted for communications with a multimode device of a calling party using at least first and second modes of voice communication, and wherein the telephony system determines a voice mode of voice communication to utilize and provides the multimode device of the calling party with voice services using the first mode of voice communication based on the determined voice mode,
    wherein the wireless cellular communication network provides the multimode mobile device of the called party with voice and data services using third and fourth modes of communication,
    wherein the first, second, third and fourth modes of communication utilize different communication protocols, and
    wherein the voicemail server is programmed to:
    store a voicemail message from the multimode device of the calling party when the multimode mobile device of the called party is non-responsive to a call initiated by the calling party by way of the telephony system using the first mode of voice communication of the multimode device;

construct a voicemail notification corresponding to the recorded message;

detect that the multimode mobile device of the called party is not roaming on the telephony system; and responsive to said detection, transmit to the multimode mobile device by way of the wireless cellular communication network a wireless message including the voicemail notification using the third mode of communication of the multimode mobile device, wherein the wireless message comprises an SMS (Short Message Service) message.

9. The voicemail system of claim 8, wherein the first mode of communication corresponds to circuit switched voice communications, wherein the second mode of communication corresponds to packet switched voice communications, wherein the third mode of communication corresponds to cellular voice communications, and the fourth mode of communication corresponds to cellular data communications.

10. The voicemail system of claim 8, wherein the telephony system is managed by a first service provider, wherein the wireless communication network is managed by a second service provider, wherein the first and second service providers operate the telephony system and the wireless communication network respectively as commercially independent enterprises, and wherein the second service provider does not have access to the voice mail server without the voicemail notification.

11. The voicemail system of claim 8, wherein the voicemail notification comprises at least one among a group of notifications comprising an identification of the calling party, a time of day when the voicemail was recorded, and a portion of the recorded message.

12. The voicemail system of claim 8, wherein the voicemail server has a database of customers and associated contact information, and wherein the voicemail server is programmed to identify from the database of customers according to a calling number used by the calling party a wireless number corresponding to the multimode mobile device of the called party.

13. The voicemail system of claim 8, wherein a calling number used by the calling party is shared among two or more customers of the voicemail system, wherein the voicemail server has a database of customers and associated contact information, and wherein the voicemail server is programmed to:

identify from the database of customers according to the calling number used by the calling party two or more wireless numbers corresponding to two or more multimode mobile devices; and transmit two or more wireless messages including the voicemail notification destined for the two or more multimode mobile devices.

14. A voicemail system, comprising:

a wireless unit for conveying wireless messages to a multimode mobile device of a called party by way of a wireless cellular communication network; and a voicemail server providing voicemail services to a telephony system, wherein the telephony system is adapted for communications with a multimode device of a calling party using at least first and second modes of voice communication, and wherein the telephony system determines a voice mode of voice communication to utilize and provides the multimode device of the calling party with voice services using the first mode of voice communication based on the determined voice mode, wherein the wireless cellular communication network provides the multimode mobile device of the called party with voice and data services using third and fourth modes of communication, wherein the first, second, third and fourth modes of communication utilize different communication protocols, and wherein the voicemail server is programmed to:

store a voicemail message from the multimode device of the calling party when the multimode mobile device of the called party is non-responsive to a call initiated by the calling party by way of the telephony system using the first mode of voice communication of the multimode device;

construct a voicemail notification corresponding to the recorded message;

detect that the multimode mobile device of the called party is not roaming on the telephony system; and responsive to said detection, transmit to the multimode mobile device by way of the wireless cellular communication network a wireless message including the voicemail notification using the third mode of communication of the multimode mobile device, wherein the voicemail server is programmed to intercept an acknowledgment from the multimode mobile device indicating the wireless message has been received.

15. The voicemail system of claim 14, wherein the first mode of communication corresponds to circuit switched voice communications, wherein the second mode of communication corresponds to packet switched voice communications, wherein the third mode of communication corresponds to cellular voice communications, and the fourth mode of communication corresponds to cellular data communications.

16. The voicemail system of claim 14, wherein the wireless message comprises an SMS (Short Message Service) message.

17. The voicemail system of claim 14, wherein the telephony system is managed by a first service provider, wherein the wireless communication network is managed by a second service provider, wherein the first and second service providers operate the telephony system and the wireless communication network respectively as commercially independent enterprises, and wherein the second service provider does not have access to the voice mail server without the voicemail notification.

18. The voicemail system of claim 14, wherein the voicemail notification comprises at least one among a group of notifications comprising an identification of the calling party, a time of day when the voicemail was recorded, and a portion of the recorded message.

19. The voicemail system of claim 14, wherein the voicemail server has a database of customers and associated contact information, and wherein the voicemail server is programmed to identify from the database of customers according to a calling number used by the calling party a wireless number corresponding to the multimode mobile device of the called party.

20. The voicemail system of claim 14, wherein a calling number used by the calling party is shared among two or more customers of the voicemail system, wherein the voicemail server has a database of customers and associated contact information, and wherein the voicemail server is programmed to:

identify from the database of customers according to the calling number used by the calling party two or more wireless numbers corresponding to two or more multimode mobile devices; and transmit two or more wireless messages including the voicemail notification destined for the two or more multimode mobile devices.

\* \* \* \* \*